(12) United States Patent
Smith et al.

(10) Patent No.: US 10,645,581 B2
(45) Date of Patent: *May 5, 2020

(54) METHOD AND APPARATUS FOR REMOTE PORTABLE WIRELESS DEVICE AUTHENTICATION

(71) Applicant: Entrust, Inc., Dallas, TX (US)

(72) Inventors: Clayton Douglas Smith, Kanata (CA); Lindsay Martin Kent, Kanata (CA)

(73) Assignee: Entrust, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,944

(22) Filed: Nov. 15, 2018

(65) Prior Publication Data

US 2019/0090131 A1 Mar. 21, 2019

Related U.S. Application Data

(63) Continuation of application No. 13/836,431, filed on Mar. 15, 2013, now Pat. No. 10,165,440, which is a
(Continued)

(51) Int. Cl.
*H04L 9/32* (2006.01)
*H04W 12/06* (2009.01)
(Continued)

(52) U.S. Cl.
CPC ........... *H04W 12/06* (2013.01); *H04L 9/3215* (2013.01); *H04L 9/3271* (2013.01);
(Continued)

(58) Field of Classification Search
CPC ... H04L 63/0492; H04L 9/3271; H04W 12/06
See application file for complete search history.

(56) References Cited

U.S. PATENT DOCUMENTS

| 6,396,412 B1 | 5/2002 | Banas |
|---|---|---|
| 7,928,829 B2 | 4/2011 | Hermann |

(Continued)

FOREIGN PATENT DOCUMENTS

| CN | 101141354 A | 3/2008 |
|---|---|---|
| CN | 102685330 A | 9/2012 |

(Continued)

OTHER PUBLICATIONS

Chinese Office Action; Chinese Patent Office; Chinese Appl. No. 201380011366.2; dated Aug. 1, 2016.
(Continued)

*Primary Examiner* — Andrew W Bee
(74) *Attorney, Agent, or Firm* — Faegre Baker Daniels LLP

(57) ABSTRACT

A method and apparatus provides for user authentication. In an example, the method and apparatus includes establishing a very short range wireless communication link between the first apparatus and the second apparatus and authenticating a user of the first apparatus by the second apparatus directly using a different and short range peer to peer wireless communication link between the first apparatus and the second apparatus in response to establishing the very short range wireless communication link.

12 Claims, 9 Drawing Sheets

Related U.S. Application Data continuation-in-part of application No. 13/742,748, filed on Jan. 16, 2013, now abandoned.

(60) Provisional application No. 61/587,474, filed on Jan. 17, 2012.

(51) Int. Cl.
    *H04L 29/06*     (2006.01)
    *H04W 12/00*     (2009.01)

(52) U.S. Cl.
    CPC ...... *H04L 63/0492* (2013.01); *H04L 63/0853* (2013.01); *H04W 12/003* (2019.01); *H04L 63/18* (2013.01); *H04L 2209/805* (2013.01)

(56) References Cited

U.S. PATENT DOCUMENTS

| | | | |
|---|---|---|---|
| 8,111,141 B1 | 2/2012 | Brand | |
| 8,145,194 B2 | 3/2012 | Yoshikawa et al. | |
| 10,165,440 B2 | 12/2018 | Smith et al. | |
| 2002/0023215 A1* | 2/2002 | Wang | G06Q 20/00 713/171 |
| 2002/0184643 A1 | 12/2002 | Fichet | |
| 2005/0198029 A1 | 9/2005 | Pohja et al. | |
| 2006/0236373 A1 | 10/2006 | Graves et al. | |
| 2007/0101153 A1 | 5/2007 | Kawaji | |
| 2007/0186106 A1 | 8/2007 | Ting et al. | |
| 2009/0191811 A1* | 7/2009 | Griffin | G06Q 20/10 455/41.1 |
| 2011/0320352 A1* | 12/2011 | Mehew | G06K 9/00885 705/44 |
| 2012/0143707 A1 | 6/2012 | Jain | |

FOREIGN PATENT DOCUMENTS

| | | | |
|---|---|---|---|
| EP | 1783695 A1 | 5/2007 | |
| EP | 2450858 A1 | 5/2012 | |
| FR | 2950505 A1 | 3/2011 | |

OTHER PUBLICATIONS

European Patent Office; International Search Report; PCT Application No. PCT/2014/027873; dated Jul. 10, 2014.
U.S. Patent Office; Non-Final Office Action; U.S. Appl. No. 13/836,431; dated Dec. 15, 2014.
U.S. Patent Office; Final Office Action; U.S. Appl. No. 13/836,431; dated Jul. 15, 2015.
U.S. Patent Office; Non-Final Office Action; U.S. Appl. No. 13/836,431; dated Mar. 2, 2016.
U.S. Patent Office; Final Office Action; U.S. Appl. No. 13/836,431; dated Jun. 8, 2016.
U.S. Patent Office; Non-Final Office Action; U.S. Appl. No. 13/836,431; dated Jan. 10, 2017.
U.S. Patent Office; Final Office Action; U.S. Appl. No. 13/836,431; dated Aug. 2, 2017.
European Patent Office; International Search Report; PCT Application No. PCT/2013/021917; dated Apr. 12, 2013.
U.S. Patent Office; Non-Final Office Action; U.S. Appl. No. 13/742,748; dated Oct. 3, 2016.
U.S. Patent Office; Final Office Action; U.S. Appl. No. 13/742,748; dated Mar. 17, 2016.
U.S. Patent Office; Non-Final Office Action; U.S. Appl. No. 13/742,748; dated Jun. 19, 2015.
State Intellectual Property Office of the People's Republic of China; CN Second Office Action; Application No. 201380011366.2; dated May 2, 2017.
State Intellectual Property Office of the People's Republic of China; CN Third Office Action; Application No. 201380011366.2; dated Dec. 14, 2017.
European Patent Office; EP Office Action; Application No. 13701558.2; dated Dec. 19, 2016.
European Patent Office; EP Office Action; Application No. 14724853.8; dated Oct. 30, 2017.
U.S. Patent and Trademark Office; U.S. Appl. No. 13/742,748; Final Rejection; dated Feb. 28, 2017.
U.S. Patent and Trademark Office; U.S. Appl. No. 13/742,748; Examiner's Answer to Appeal Brief; dated Apr. 5, 2018.
European Patent Office; EP Office Action; Application No. 14724853.8; dated Oct. 25, 2018.
Pinkumphi, Sayam et al.; Real-Time Audio Multicasting on Bluetooth Network; Electrical Engineering/Electronics, Computer, Telecommunications and Information Technology, 2009, ECTI-CON 2009, 6th International Conference on, IEEE; May 6, 2009.
State Intellectual Property Office of the People's Republic of China; CN Fourth Office Action; Application No. 201380011366.2; dated Jul. 3, 2018.
State Intellectual Property Office of the People's Republic of China; CN First Office Action; Application No. 201480023486.9; dated May 3, 2018.
State Intellectual Property Office of the People's Republic of China; CN Second Office Action; Application No. 201480023486.9; dated Jan. 22, 2019.

* cited by examiner

METHOD AND APPARATUS FOR REMOTE PORTABLE WIRELESS DEVICE AUTHENTICATION

RELATED CO-PENDING APPLICATION

This application is a continuation of application Ser. No. 13/836,431, filed on Mar. 15, 2013, having inventors Clayton Douglas Smith et al., titled "METHOD AND APPARATUS FOR REMOTE PORTABLE WIRELESS DEVICE AUTHENTICATION", which is a continuation-in-part of application Ser. No. 13/742,748, filed on Jan. 16, 2013, having inventors Clayton Douglas Smith et al., titled "METHOD AND APPARATUS FOR REMOTE PORTABLE WIRELESS DEVICE AUTHENTICATION", which claims priority to Provisional Application Ser. No. 61/587,474, filed on Jan. 17, 2012, having inventors Clayton Douglas Smith et al., titled "METHOD AND APPARATUS FOR REMOTE PORTABLE WIRELESS DEVICE AUTHENTICATION", all of which are incorporated herein by reference.

BACKGROUND OF THE DISCLOSURE

The disclosure relates generally to a method and apparatus for using a smart phone to authenticate the user to a smart card reader emulation device.

As computers and other electronic devices store an increasingly large and sensitive amount of information, the computers and other electronic devices must be secured against unauthorized users. An effective way of securing computers and other electronic devices is to encrypt or otherwise disallow access to a computer until a user provides hardware and/or software that includes unique identifying information about the user. In one embodiment, smart cards may be used to store and transmit unique information about a user to a computer, so that the user may request and gain access to the computer. The smart card includes software and/or hardware, and also stores information that uniquely identifies a user. The uniquely identifying information may include, for example, representative biometric information about the user, a unique encryption certificate generated for the user, or other uniquely identifying information. The user may request access to a computer, and be granted access if the user is authenticated. Smart cards, generally, are physical devices that include memory, and may include other processing components, such as a processor and/or battery. The smart cards generally must be carried by the user, and inserted directly into a computer or device associated with the computer. If a user wishes to gain access to many computers, the user may need more than one smart card. The weight and bulk of one or more smart cards may deter users and/or administrators from implementing smart card security. It is common for users to carry smart phones, and smart phones include memory and/or processing capability that may enable them to operate as a smart card. Replacing one or more smart cards with a single smart phone may reduce overall bulk, and may make it more likely for users to implement smart card security.

Known smart card emulation systems can include a component located on a smart phone to remotely lock and unlock a computer via a Bluetooth connection. However such systems do not appear to allow a user to select a signal strength of the Bluetooth connection to change the range that the smart phone may lock or unlock the computer.

Also, it is known to allow a user to automatically lock and unlock a computer using a Bluetooth device such as a mobile phone. The user can configure the proximity distance and duration, and when the Bluetooth device moves away from the computer, the screensaver is triggered and the computer is locked. When the Bluetooth device is in range, the program unlocks the computer, without requiring user input. However, such systems do not require authentication of the Bluetooth device, or transmission of data between the Bluetooth device and the computer for authentication of the Bluetooth device to the computer.

Near field communication techniques are also known between wireless devices that use very short range wireless links. Setting up the near field communication links can involve exchanging key pairs used to establish a Bluetooth connection or a short range connection. As such, two different wireless protocols are used using two different types of short range links. The information that is transferred in the near field communication may include, for example, key pairs and device IDs that are then used by two devices to establish a short range communication link wherein the short range communication link is encrypted. Typically, the systems authenticate each device to each other to provide a type of mutual authentication of devices. However, the user may have to select from many machines in a room if they want to authenticate two machines in a wireless range. Also, user authentication is not typically provided with such systems.

Also in systems that fail to employ very short range communication links, such as pure Bluetooth links or other short range links, user authentication can be provided to automatically unlock a device when the Bluetooth device is activated. However, when multiple devices are within range, a user needs to typically manually select which device to unlock. Accordingly, it is desirable to have an improved user authentication technique.

Accordingly, there exists a need for an improved method and apparatus for using a portable wireless device to authenticate a user.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
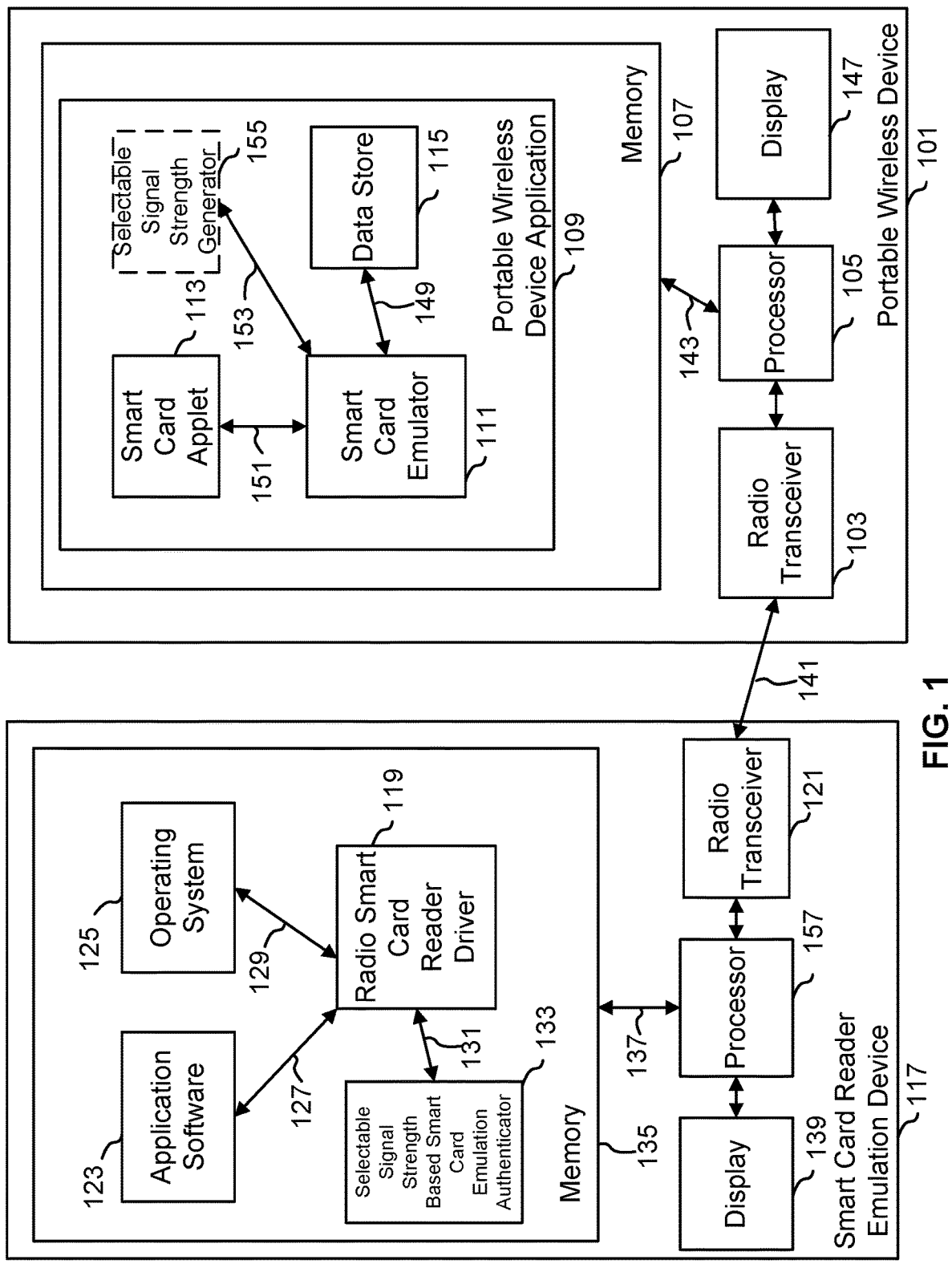
FIG. 1 is a block diagram illustrating an example of a system for remote smart phone authentication according to an embodiment of the present disclosure.

Briefly, in one example, a method for user authentication is provided. In an example, the method and apparatus includes establishing a very short range wireless communication link between the first apparatus and the second apparatus and authenticating a user of the first apparatus by the second apparatus directly using a different and short range peer to peer wireless communication link between the first apparatus and the second apparatus in response to establishing the very short range wireless communication link.

In some embodiments the method includes receiving a selected signal strength for smart card emulation authentication. The method also includes receiving a signal from a portable wireless device radio transceiver. The method also includes measuring the signal strength of the signal. The method also includes, if the signal is at or above the selected signal strength, transmitting one or more signals to the portable radio device radio transceiver requesting user authentication, and if the signal is not at or above a selected signal strength, refusing a request to authenticate by the portable radio device radio transceiver. The method also includes receiving one or more authentication response signals from the portable radio device in response to the request for user authentication, the one or more response signals including at least authentication information unique to a user.

In another example, a method for user de-authentication is provided. The method includes receiving a selected signal strength for smart card emulation authentication. The method also includes receiving one or more response signals from the portable wireless device in response to a request for user authentication, the smart card reader emulation device radio transceiver receiving a signal. The method also includes monitoring the strength of the signal, so that if the signal is at or below the selected signal strength, the smart card reader emulation device de-authenticates a portable wireless device associated with the portable wireless device radio transceiver.

In another example, an apparatus for user authentication is provided, including logic. The logic is operable to receive a selected signal strength for smart card emulation authentication. The logic is also operable to receive a signal from a portable wireless device radio transceiver. The logic is also operable to measure the signal strength of the signal. The logic is also operable to, if the signal is at or above the selected signal strength, transmit one or more signals to the portable radio device radio transceiver requesting user authentication, and if the signal is not at or above a selected signal strength, refuse a request to authenticate by the portable radio device radio transceiver. The logic is also operable to receive one or more authentication response signals from the portable radio device in response to the request for user authentication, the one or more response signals including at least authentication information unique to a user.

In another example, computer-readable storage medium comprising executable instructions are provided that, when executed by one or more processors, causes the one or more processors to: receive a selected signal strength for smart card emulation authentication, receive a signal from a portable wireless device radio transceiver, measure the signal strength of the signal, if the signal is at or above the selected signal strength, transmit one or more signals to the portable radio device radio transceiver requesting user authentication, and if the signal is not at or above a selected signal strength, refuse a request to authenticate by the portable radio device radio transceiver, and receive one or more authentication response signals from the portable radio device in response to the request for user authentication, the one or more response signals including at least authentication information unique to a user.

Among other advantages, the present disclosure may allow the use of portable wireless devices or other devices a user carries with one or more processors and memory in place of one or more smart cards. Accordingly, the proposed techniques can improve user control of devices by providing a more intuitive and user-friendly way to use a smart card infrastructure and/or other multi-factor authentication effectively. Additionally, the smart phone's keyboard, touch screen, and other sensors can be used as inputs to the smart card applet. Information about which resources are being authenticated to can be presented to the user on the smart phone's screen, so that the user is aware of what resources are being accessed while the smart phone is connected to the computer. The user could also be given a choice about whether or not to accept such accesses. Also, information stored in the smart card applet can be displayed to the user on the smart phone's screen.

FIG. 1 illustrates an example of a system for remote portable wireless device 101 authentication according to an embodiment of the present disclosure. In this example, a radio smart card reader driver 119 on a smart card reader emulation device 117 sends communications to an application 123 and/or operating system 125, indicating that a smart card reader is installed although an actual smart card reader is not installed (instead the smart card emulation device is present), and intercepts communications between the application software 123 or the operating system 125 and the fictional smart card reader. The radio smart card reader driver 119 transmits the communication or communications to the portable wireless device 101 via a smart card reader emulation device radio transceiver 121. The portable wireless device application 109 operates on the portable wireless device 101 and includes encryption certificates or other authentication information, and transmits the authentication information or other signals to the radio smart card reader driver 119 based on the communication received from the application software 123 and/or the operating system 125. By intercepting the communication between the application software 123 and/or the operating system 125, the radio smart card reader driver 119 can replace a smart card with a portable wireless device application 109 running on a portable wireless device 101, so that a smart card reader is not necessary to utilize functions associated with the application 123 and/or the operating system 125 that are reserved for smart cards.

The portable wireless device 101 may be a computing system or other hardware that includes logic, such as logic that includes, but is not limited to, one or more processors 105, suitable memory, suitable communication interfaces as known in the art, and one or more input and output devices, such as a display 139, as known in the art. In an embodiment, the portable wireless device 101 includes a portable wireless device radio transceiver 103, and the portable wireless device radio transceiver 103 may enable communication between the portable wireless device 101 and one or more smart card reader emulation devices 117, or a portable wireless device 101 and one or more networks. In an embodiment, the portable wireless device radio transceiver 103 operates over a short range. In an embodiment, the short range is approximately thirty meters or less. In an embodiment, the portable wireless device 101 also includes a radio that allows for long range communication, in the embodiment, more than thirty meters. The portable wireless device 101 may include a telephone portion, including telephone communication circuitry. In an embodiment, the portable wireless device 101 includes additional circuitry or other hardware to provide access to one or more networks, such as, for example, the Internet. In an embodiment, the portable wireless device 101 includes one or more processors 105 that are operable to execute instructions, retrieve locations in the memory 107, and write locations to the memory 107. The processor 105 may access the memory 107 via one or more busses 143. In an embodiment, the memory 107 includes, but is not limited to, hard disk drives, flash memory, random-access memory, or other data storage and recall devices. The portable wireless device 101 may also be associated with additional elements, such as an operating system, a speaker, a microphone, an antenna, a display 147, and an input device. The input device may be, for example and without limitation, a keyboard and/or touch screen. The portable wireless device 101 may include more than one input device, or may be capable of input from one or more input devices.

The portable wireless device radio transceiver 103, in this example is a short range transceiver operative to communicate using Bluetooth (peer to peer) operations or any suitable operation and may be hardware or a combination of hardware and executing software. The portable wireless device radio transceiver 103 may, in an embodiment, also be adapted to communicate with one or more cellular telephone networks (WWAN), to transmit data and/or voice signals. As explained in more detail below, the portable wireless device radio transceiver 103 may include one or more modules to communicate over one or more frequencies, or with one or more communication protocols. The portable wireless device radio transceiver 103 receives signals from the smart card reader emulation device radio transceiver 121, and may include communication protocols and/or frequencies that allow the portable wireless device radio transceiver 103 to communicate with the smart card reader emulation device radio transceiver 121. The portable wireless device radio transceiver 103 receives one or more signals from the smart card reader emulation device radio transceiver 121, decodes and/or decrypts the signal to retrieve communications, and transmits the communications to the portable wireless device application 109 or other applications operating on the portable wireless device 101. The portable wireless device radio transceiver 103 also receives communications from the portable wireless device application 109 and/or other applications operating on the portable wireless device 101, and, in the embodiment, transmits them to smart card reader emulation device radio transceiver 121. In an embodiment, the portable wireless device radio transceiver 103 employs encryption and/or compression algorithms to the communications before transmitting the communications to the smart card reader emulation device radio transceiver 121.

The portable wireless device application 109 includes one or more instructions stored in memory, and is executable by the processor on the portable wireless device 101. The portable wireless device application 109, in an embodiment, remains resident in the memory while the portable wireless device 101 is operating. The portable wireless device application 109 may include one or more modules operable to receive input, generate output, and execute tasks related to the input. The module, in the example, is a processor or a portion of a processor executing instructions to cause the processor to perform one or more functions. The portable wireless device application 109 includes at least a smart card applet 113, a smart card emulator 111, and data storage. The portable wireless device application 109 may also include other modules that allow communication between the portable wireless device application 109 and other applications resident in the memory of the portable wireless device 101. In an embodiment, the portable wireless device application 109 data store 115 is associated with the operating system of the portable wireless device 101, so that the portable wireless device application 109 accesses the data store 115 that is associated with the portable wireless device 101, instead of having a separate data store 115. The portable wireless device application 109 may access a data store 115 associated with the portable wireless device 101 by using one or more instructions provided by the operating system operating on the portable wireless device 101. Inputs to the portable wireless device application 109 may be received from the smart card reader emulation device 117, or inputs to the portable wireless device application 109 may be generated by the portable wireless device 101. Additional inputs associated with the smart card reader emulation device 117 or the portable wireless device 101 may also be used such as, for example and without limitation, biometric input devices such as fingerprint readers or cameras.

The smart card emulator 111 is associated with the portable wireless device application 109, and interacts with the radio transceiver 103, or other applications executing in the memory of the portable wireless device 101. The smart card emulator 111 receives input from the radio transceiver or other applications executing in the memory of the portable wireless device 101, and requests information of the data store 115 and/or the smart card applet 113 in response to the input. And input may be, for example, a request for one or more certificates stored in the data store 115, a PIN authentication, a request for a digital signature, a request for a decryption operation, or other activities associated with a smart card. The information retrieved from the smart card applet 113 and/or the data store 115 is transmitted to the radio transceiver 103, or the requesting application resident in the memory of the portable wireless device 101. The smart card emulator 111 provides a library of functions that are normally available from a smart card, so that the smart card emulator 111 can receive communication normally transmitted to a smart card, and can generate responses that would normally be transmitted by the smart card. In the embodiment, the smart card emulator communicates with the smart card applet 113 via line 151, and with the data store via line 115. The smart card emulator 111 may optionally also communicate with a selectable signal strength generator 155 via line 153.

The smart card applet 113 includes software executing in memory associated with the portable wireless device 101, and executes requests for authentication. The smart card applet 113 may, in an embodiment, create public/private key pairs, and store the public key and/or private key in memory. In an embodiment, the smart card applet 113 includes public key/private key pairs, and provides for the secure storage of the keys. In an embodiment, the smart card applet 113 may include key history. In an embodiment, the smart card applet 113 may include certificates for each key pair, and may store the certificates. In an embodiment, the smart card applet 113 may include and/or store digitally signed facial recognition data points associated with a user. In embodiment, the smart card applet 113 may include and/or store digitally signed fingerprint data points associated with a user. In an embodiment, the smart card applet 113 may include additional data structures to store and/or retrieve authentication information related to user. In an embodiment, the authentication information related to the user may be digitally signed and or verified. Other information stored or accessed by the smart card applet 113 include personal identification numbers (PINs) or passwords, along with associated lockout counters which limit the number of invalid guesses an attacker may make.

The data store 115 may include the state of the smart card applet 113. State information may also include, but is not limited to keys, certificates, fingerprints, PINs and lockout counters, or other information. The state information associated with the data store 115 may be, in an embodiment, a snapshot of the data stored in it at a given moment in time. In an embodiment, the data store 115 may include images or keys or data structures that are associated with the smart card applet 113, and that the smart card applet 113 may use to authenticate a user to a smart card reader emulation device 117. The data store 115 may, in an embodiment, be one or more data structures stored in the memory associated with the portable wireless device 101, and available to the portable wireless device application 109. In an embodiment, the contents of the data store 115 may be modified by the portable wireless device application 109. In an embodiment, the data store 115 may be encrypted, and the encryption keys may be held by the portable wireless device application 109 and/or another application executing in the memory of the portable wireless device 101.

The selectable signal strength generator 155 may include optional functionality, and may allow a selection of the signal strength to be made from the portable wireless device 101. In an embodiment, the selectable signal strength generator 155 includes one or more graphical user interfaces to allow a user or administrator to select one or more signal strengths. For example, the selectable signal strength generator 155 may allow a user to select a signal strength based on the user's proximity to a smart card reader emulation device 117, so that the user may be positioned relative to the smart card reader emulation device 117 where the user would like an action to occur, and may use the selectable signal strength generator 155 to set the signal strength based on the user's proximity to the radio transceiver 121 of the smart card reader emulation device 117. The selectable signal strength generator 155 communicates the selection of signal strength to the smart card emulator 111 via line 153, and may receive communication from the smart card emulator 111 via line 153. In an embodiment, the graphical user interface may include the functionality shown in FIG. 6.

Figure 6:
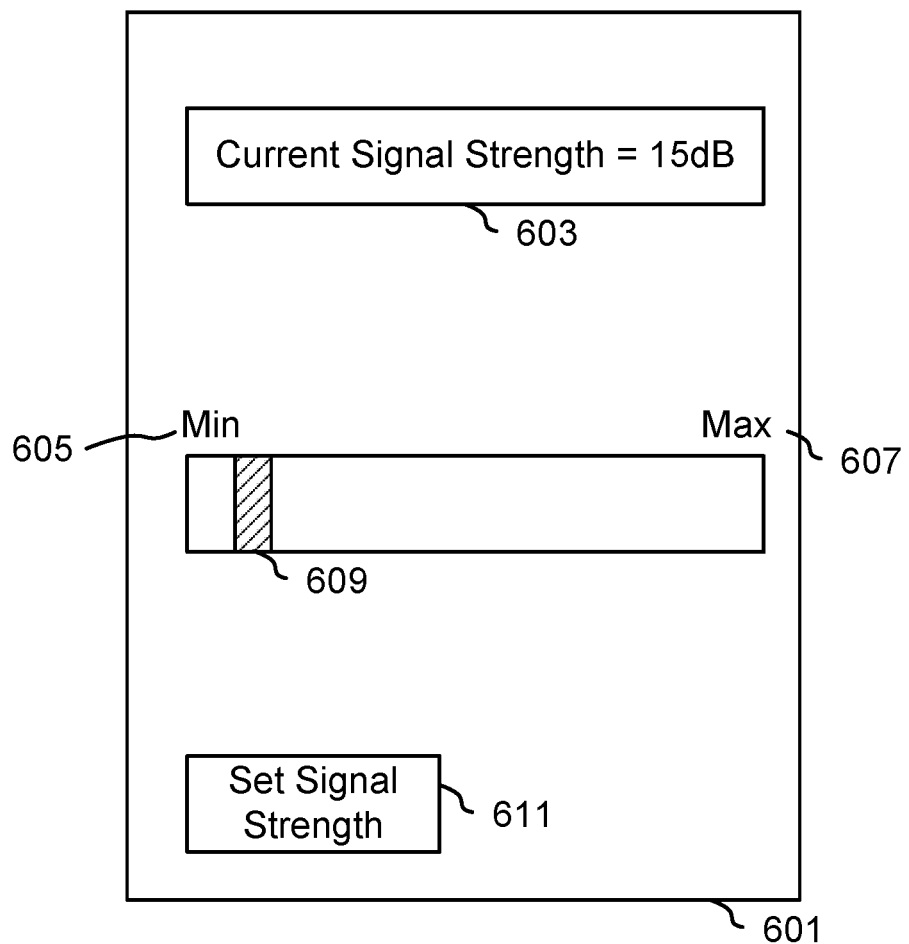
FIG. 6 is an exemplary graphical user interface showing a selectable signal strength according to an embodiment of the present disclosure.

In FIG. 6, a graphical user interface 601 is shown. The graphical user interface 601 includes, but is not limited to, a display 603 that shows the current signal strength. In the embodiment, the current signal strength is shown as 15 dB. The user may select a slider 609, to move the selected signal strength between a minimum 605, which, in the embodiment, may turn off the connection, and a maximum 607, which may indicate the maximum range of the radio connection link 141. The user may select the appropriate signal strength, and may save the selection using the "set signal strength" button 611. The graphical user interface is generated and presented by the processor 105 on the screen for use by a user. In an embodiment, the selectable signal strength based smart card emulation authenticator 133 operate a graphical user interface similar to graphical user interface 601. The selectable signal strength based smart card emulation authenticator 133 may operate the graphical user interface 601, where the graphical user interface 601 is resident in the memory 135, and is executed by the processor 157. In an embodiment, the graphical user interface 601 may include additional functionality, such as the ability for a user to select the signal strength based on the current signal strength.

The smart card reader emulation device 117 may be, for example and without limitation, a an executing software module executing by logic, such as logic that includes one or more processors 157 and suitable memory 135, discrete logic, an ASIC or any suitable structure. The smart card reader emulation device 117 may include a radio transceiver 121 (e.g. a short range transceiver), which complements the portable wireless device radio transceiver 103, so that the smart card reader emulation device radio transceiver 121 may communicate with the portable wireless device radio transceiver 103. The smart card reader emulation device 117 also includes a radio smart card reader driver 119, application software 123, and one or more operating systems. The radio smart card reader driver 119, application software 123, and one or more operating systems may reside in memory associated with the smart card reader emulation device 117. The memory 135 may, in an embodiment, be nonvolatile. In an embodiment, the radio smart card reader driver 119, application software 123, and one or more operating systems are associated with logic operating on the smart card reader emulation device 117. In an embodiment, the logic includes one or more processors 105, operable to execute instructions residing in memory 135. In an embodiment, the memory 135 includes, but is not limited to, hard disk drives, flash memory, random-access memory, or other data storage and recall devices. The processor 157 communicates with the memory 135 via one or more busses 137. The smart card reader emulation device 117 may also be associated with additional elements, such as, for example, a display 147, and an input device. The input device may be, for example and without limitation, a keyboard and/or touch screen. The smart card reader emulation device 117 may include more than one input device, or may be capable of input from one or more input devices.

The application software 123 may include one or more applications executed by the operating system. The application software 123 includes, in an embodiment, software that requires the authentication of a user. For example, application software 123 may require user authentication to digitally sign a document, access information stored on the memory associated with the smart card reader emulation device 117, or another smart card reader emulation device 117 associated with the smart card reader emulation device 117 via one or more networks, or add, edit, or delete data. In an embodiment, the application software 123 requests user authentication through one or more commands provided by the operating system. In another embodiment, the application software 123 requests user authentication directly from the portable wireless device 101 via the radio smart card reader driver 119. The application software sends commands, in an embodiment, to the operating system 125 and/or other applications in the memory 135, which are received by the radio smart card reader driver 119. The application software 123 may also receive signals from the radio smart card reader driver 119. The communication between the application software 123 and the radio smart card reader driver 119 is shown in line 127.

The operating system 125 includes the operating system currently executing in the memory of the smart card reader emulation device 117. The operating system 125 may include one or more drivers to receive input from input devices associated with the smart card reader emulation device 117, and generate output to output devices associated with the smart card reader emulation device 117. Input devices may include, but are not limited to, keyboards, smart card reader emulation device 117 mice, or one or more network interface cards, that receive input signals from one or more networks, and generate output signals to the one or more networks. Output devices may include, but are not limited to, displays 139, one or more network interface cards, printers, or other devices associated and in communication with the smart card reader emulation device 117. The operating system 125 may include one or more commands to allow application software 123 to receive input from devices associated with the smart card reader emulation device 117, and generate output to the devices associated with the smart card reader emulation device 117. In an embodiment, the commands include one or more commands designated as application programming interface commands. Application programming interface commands may be commands that allow applications to communicate with the operating system. The operation system 125 transmits signals to the radio smart card reader driver 119, and receives signals from the radio smart card reader driver 119, as indicated in line 129.

In an embodiment, the operating system 125 includes one or more commands for a user to authenticate to the operating system 125, in order to gain access to commands provided by the operating system 125. Commands may allow a user to, for example, interact with the operating system, interact with one or more applications associated with the operating system, or access data or execute programs through the operating system. The operating system 125 may include, for example, commands to interact with a smart card reader, and query a smart card for data that authorizes the user to the smart card reader emulation device 117. In an embodiment, the operating system requires authentication to allow user to log on to the operating system.

The selectable signal strength based smart card emulation authenticator 133 allows a selection of the signal strength to be made. In an embodiment, the selectable signal strength based smart card emulation authenticator 133 includes one or more graphical user interfaces to allow a user or administrator to select one or more signal strengths. For example, the graphical user interface may allow a user to select signal strengths based on an individual portable wireless device 101, so that different portable wireless devices 101 have different signal strength requirements. In another embodiment, the signal strengths may be selected based on one or more security models or other security parameters. In an embodiment, signal strength selections are made via one or more application programming interfaces to the selectable signal strength based smart card emulation authenticator 133. The selectable signal strength based smart card emulation authenticator 133 communicates the selection of signal strength to the radio smart card reader driver 119, and receives information from the radio smart card reader driver 119, as shown in line 131.

The radio smart card reader driver 119 includes executing software and/or hardware associated with the smart card reader emulation device 117 to replace a smart card reader. The radio smart card reader driver 119 includes software and/or instructions operating on the smart card reader emulation device 117 that intercept authentication requests between the application software 123 and/or the operating system 125, and a smart card reader. For example, the application software 123 may attempt to send an authentication request to a smart card reader. The radio smart card reader driver 119 intercepts the authentication request, so that the smart card reader emulation device 117 does not need to operate a smart card reader. The radio smart card reader driver 119 receives authentication requests from the application software 123 and or the operating system 125, and translates the authentication request into a format that is readable and answerable by the portable wireless device application 109 executing on the portable wireless device 101. The radio smart card reader driver 119 communicates with the smart card reader emulation device radio transceiver 121 to send commands via the radio transceiver to the portable wireless device 101. The radio smart card reader driver 119 also receives communication from the smart card reader emulation device radio transceiver 121, and translates the communication into responses to the authentication requests from the application software 123 and/or the operating system 125. The authentication requests may include, for example, a request for authentication for digital signing, or requests for authentication of a user. The radio smart card reader driver 119 functions as a replacement for a smart card reader on the smart card reader emulation device 117, and appears as a smart card reader to the application software 123 and/or the operating system 125.

The link 141 between the smart card reader emulation device radio transceiver 121 and the portable wireless device radio transceiver 103 includes, but is not limited to, signals transmitted from the smart card reader emulation device radio transceiver 121 to the portable wireless device radio transceiver 103, or from the portable wireless device radio transceiver 103 to the smart card reader emulation device radio transceiver 121. The signals may include signals required by a protocol over which both transceivers operate, to maintain a link between the two transceivers, which may also include one or more control signals. The signals may also include signals to transmit data between the two transceivers, which may also be known as data signals. Either of the control signals and the data signals may include additional information. For example, and without limitation, signals transmitted by the portable wireless device radio transceiver 103 to the smart card reader emulation device radio transceiver 121 may be received by the smart card reader emulation device radio transceiver 121, which may also receive signal strength information, or other information regarding the strength and/or quality of the link 141 between the two transceivers. In an embodiment, the data signals include authentication request signals and/or authentication response signals so that the portable wireless device radio transceiver 103 to the smart card reader emulation device radio transceiver 121 may authenticate to one another.

The smart card reader emulation device radio transceiver 121 may include one or more modules to communicate over one or more frequencies, or with one or more communication protocols, such as Bluetooth transceiver. The smart card reader emulation device radio transceiver 121 receives signals from the portable wireless device radio transceiver 103, and may include communication protocols and/or frequencies that allow the smart card reader emulation device radio transceiver 121 to communicate with the portable wireless device radio transceiver 103. The smart card reader emulation device radio transceiver 121 receives one or more signals from the portable wireless device radio transceiver 103, decodes and/or decrypts the signal to retrieve communications, and transmits the communications to the radio smart card reader driver 119. The smart card reader emulation device radio transceiver 121 also receives communications from the radio smart card reader driver 119, and, in the embodiment, transmits them to the portable wireless device radio transceiver 103. In an embodiment, the smart card reader emulation device radio transceiver 121 employs encryption and/or compression algorithms to the communications before transmitting them to the portable wireless device radio transceiver 103.

In an embodiment, the smart card reader emulation device radio transceiver 121 may also receive information associated with the portable wireless device radio transceiver 103. The information may include, but is not limited to, strength of the radio signal from the portable wireless device 101. The strength of the radio signal from the portable wireless device 101 may indicate the approximate location of the portable wireless device 101 relative to the smart card reader emulation device radio transceiver 121. For example, a weak radio signal from the portable wireless device radio transceiver 103 may indicate that the portable wireless device 101 is at a comparatively larger distance from the smart card reader emulation device radio transceiver 121 than if the radio signal was stronger.

In an embodiment, the application software 123, the operating system 125, the radio smart card reader driver 119, the smart card applet 113, the smart card emulator 111, and the data store 115 described herein may be implemented as software programs stored on a smart card reader emulation device 117 readable storage medium such as but not limited to CD-ROM, RAM, ROM, other forms of ROM, hard drives, distributed memory, etc., in combination with processors. As such, software programs may be stored on smart card reader emulation device 117 readable storage medium. The smart card reader emulation device 117 readable storage medium stores instructions executable by one or more processors that causes the one or more processors to perform operations described herein. In the embodiment shown in FIG. 1, the application software 123, the operating system 125, and the radio smart card reader driver 119 are stored in smart card reader emulation device 117 readable storage medium and are associated with each other, and the smart card applet 113, the smart card emulator 111, and the data store 115 are stored in smart card reader emulation device 117 readable medium and are associated with each other.

Figure 2:
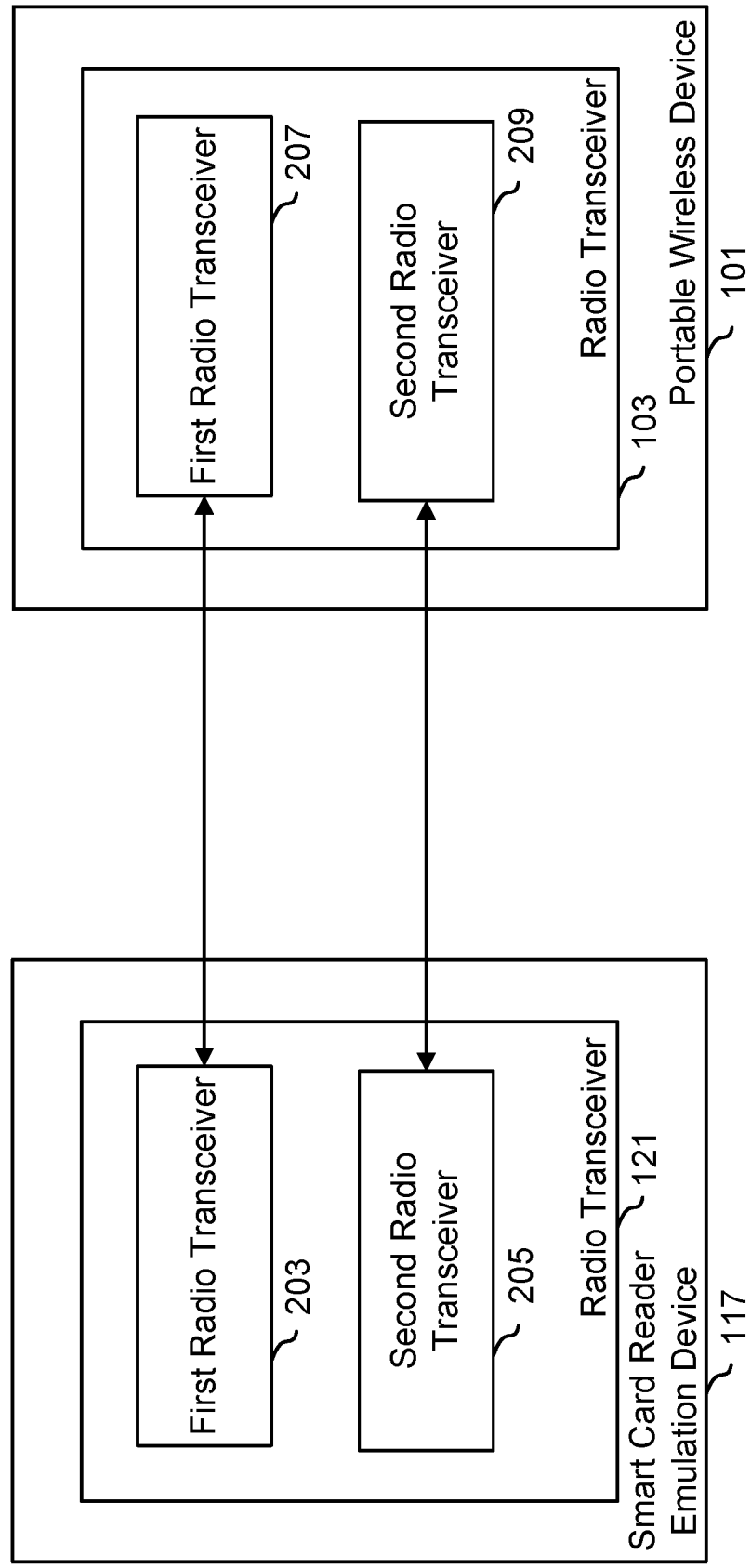
FIG. 2 is a block diagram illustrating smart card reader emulation device and smart phone radio transceivers according to an embodiment of the present disclosure.

FIG. 2 is a block diagram illustrating smart card reader emulation device and portable wireless device radio transceivers according to an embodiment of the present disclosure. In the embodiment, the smart card reader emulation device radio transceiver 121 includes first radio transceiver 203 and a second radio transceiver 205. The first radio transceiver 203 includes transmission and receiving structures that allow the smart card reader emulation device radio transceiver 121 to communicate with the portable wireless device 101 via a first protocol and/or a first frequency. The second radio transceiver 205 includes transmission and receiving structures that allow the smart card reader emulation device radio transceiver 121 to communicate with the portable wireless device 101 via a second protocol and/or a second frequency. Similarly, the portable wireless device radio transceiver 103 includes a first radio transceiver 207 and a second radio transceiver 209 that complement the first radio transceiver 203 and the second radio transceiver 205 in the smart card reader emulation device radio transceiver 121, respectively. The smart card reader emulation device radio transceiver 121 and the portable wireless device radio transceiver 103 may include, for example, additional hardware or combination of hardware and executing software that allows communication between the two radio transceivers over different frequencies and/or different communication protocols. In an embodiment, the first radio transceiver and the second radio transceiver of either the smart card reader emulation device 117 or the portable wireless device 101, or both, are implemented using software executing on one or more processors, and share common hardware structures. For example, the first radio transceiver and the second radio transceiver may share a common antenna, or a common receiver, but the frequencies associated with the first radio transceiver and the second radio transceiver may be different, and may be interpreted differently using the software. For example, communications received by a first frequency may be interpreted using a first protocol, and communications received by a second frequency may be interpreted using a second protocol. In an embodiment, the first and second radio transceivers are separate structures. In the embodiment, the first and second radio transceivers may not share components, may communicate directly with processors or memory, and may operate independently of one another.

Figure 3:
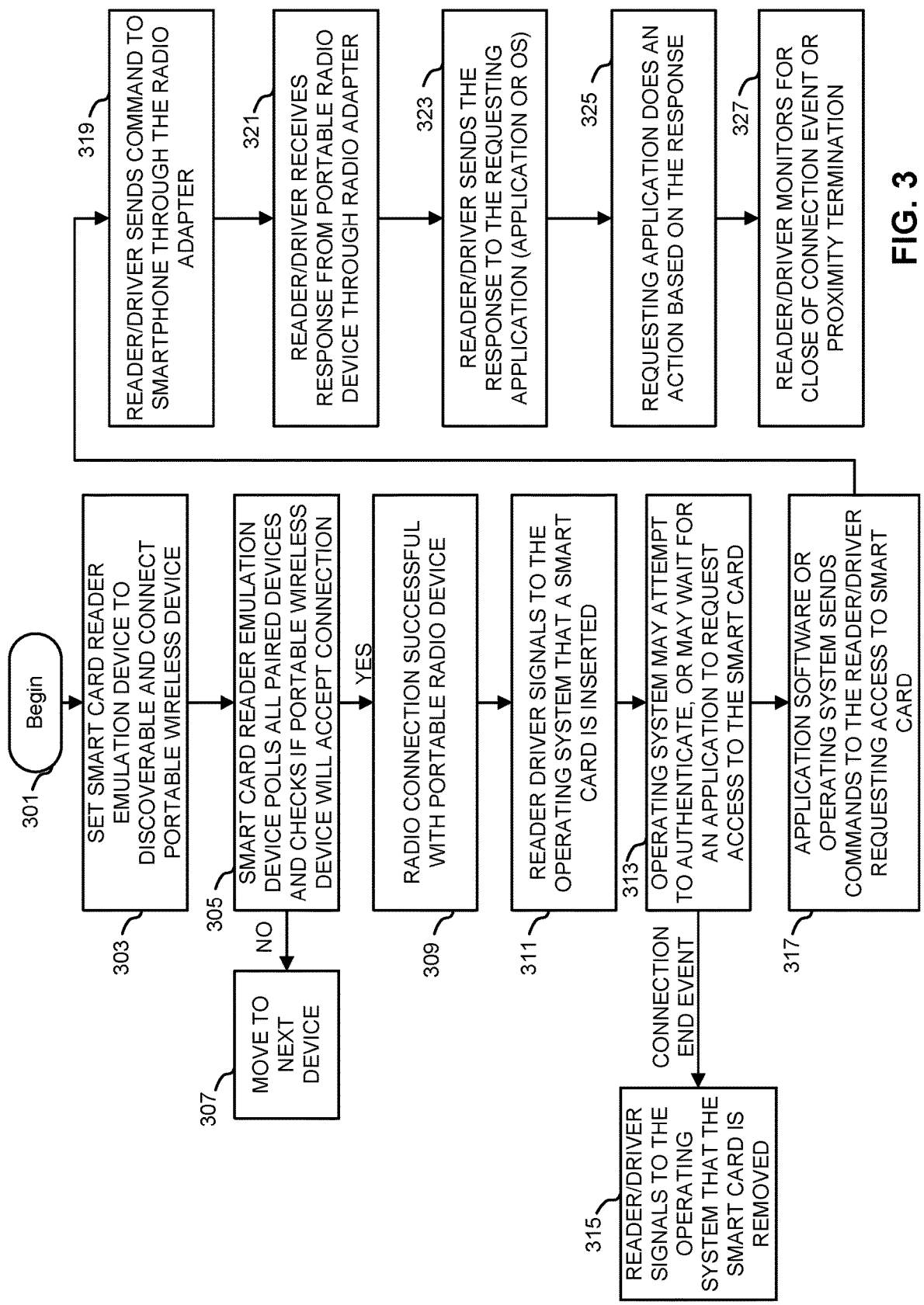
FIG. 3 is a flowchart illustrating remote authentication from a smart card reader emulation device according to an embodiment of the present disclosure.

FIG. 3 is a flowchart illustrating remote authentication from a smart card reader emulation device 117 according to an embodiment of the present disclosure. The method begins at block 301. At block 303, the smart card reader emulation device radio transceiver 121 is set to a discoverable mode. The discoverable mode, in an embodiment, allows the smart card reader emulation device radio transceiver 121 to search for devices that it may connect to and communicate with. In an embodiment, the radio smart card reader driver 119 sets the smart card reader emulation device radio transceiver 121 into a discoverable mode. In an embodiment, the operating system 125 or other executable program sets the smart card reader emulation device radio transceiver 121 into a discoverable mode.

In block 305, the smart card reader emulation device 117 polls all of the devices that the smart card reader emulation device radio transceiver 121 may communicate with. If a portable wireless device 101 or other device with a comparable radio transceiver is found, the smart card reader emulation device radio transceiver 121 attempts to determine if the smart card reader emulation device radio transceiver 121 may connect with the radio transceiver associated with the device. If the smart card reader emulation device radio transceiver 121 may not connect with the radio transceiver associated with the device, the smart card reader emulation device 117 attempts to connect with other devices in the vicinity, as shown in block 307. If the smart card reader emulation device radio transceiver 121 may connect to the radio transceiver associated with the device, the smart card reader emulation device radio transceiver 121 checks to see if the device will accept the connection. If the device will not accept the connection, the smart card reader emulation device 117 will move to the next device, as shown in block 307. If the device will accept the connection, the smart card reader emulation device 117 will attempt to create a successful connection with the device, as shown in block 309. In an embodiment, the portable wireless device 101 initiates a connection to the smart card reader emulation device 117. The portable wireless device may initiate the connection by transmitting one or more signals to the smart card reader emulation device 117.

In block 311, the smart card reader emulation device radio transceiver 121 may send one or more signals to the portable wireless device radio transceiver 103. The portable wireless device application 109 operating on the portable wireless device 101 may receive the one or more signals, and may generate one or more signals for transmission from the portable wireless device radio transceiver 103 to the smart card reader emulation device radio transceiver 121. The smart card reader emulation device radio transceiver 121 receives the one or more signals, and transmits them to the radio smart card reader driver 119. Based on the signals received from the portable wireless device application 109, the radio smart card reader driver 119 recognizes that the portable wireless device application 109 is operating on the portable wireless device 101. The radio smart card reader driver 119 may, in an embodiment, send one or more signals to the operating system 125 that a smart card has been inserted. The radio smart card reader driver 119, by sending these signals to the operating system 125, communicates to the operating system 125 that a smart card has been inserted into a smart card reader, when, in fact, there may not be a smart card reader associated with the smart card reader emulation device 117.

In block 313, the operating system 125 may attempt to send an authentication request to the smart card. In another embodiment, the operating system in the operating system 125 may wait for one or more applications in the application software 123 to send an authentication request to the smart card. While the operating system 125 is waiting, the portable wireless device 101 may move out of range of the smart card reader emulation device radio transceiver 121, in a connection end event. In a connection end event, indicated in block 315, the smart card reader emulation device radio transceiver 121 signals to the radio smart card reader driver 119 that a portable wireless device 101 or other device that was once connected to the smart card reader emulation device radio transceiver 121, is no longer found. The radio smart card reader driver 119 receives the signals from the smart card reader emulation device radio transceiver 121, and sends signals to the operating system 125 and/or the application software 123 that a smart card has been removed from the smart card reader.

In block 317, the operating system 125 and/or the application software 123 sends one or more commands to the radio smart card reader driver 119 requesting access to the smart card. The request may be, for example and without limitation, a request to access data located on the smart card, or one or more authentication requests based on information associated with the smart card.

The radio smart card reader driver 119 receives the commands from the application 123 and/or the operating system 125, and sends the commands to the portable wireless device application 109 via the smart card reader emulation device radio transceiver 121, as shown in block 319. The smart card reader emulation device radio transceiver 121 receives the command, and transmits the commands to the portable wireless device radio transceiver 103. The transmission may occur via one or more communication protocols known by both the smart card reader emulation device radio transceiver 121 and the portable wireless device radio transceiver 103. In an embodiment, the commands are encrypted by the smart card reader emulation device radio transceiver 121. In an embodiment, the commands are compressed by the smart card reader emulation device radio transceiver 121 before transmission to the portable wireless device radio transceiver 103.

The smart card reader emulation device radio transceiver 121 receives one or more response signals from the portable wireless device radio transceiver 103, as shown in block 321. In an embodiment, the smart card reader emulation device radio transceiver 121 decrypts the signals received from the portable wireless device radio transceiver 103. In an embodiment, the smart card reader emulation device radio transceiver 121 decompresses the signals received from the portable wireless device radio transceiver 103. The smart card reader emulation device radio transceiver 121 sends the response to the radio smart card reader driver 119.

In block 323, the radio smart card reader driver 119 transmits the response to the requesting software. In an embodiment, the radio smart card reader driver 119 transmits the response to the operating system 125. In an embodiment, the radio smart card reader driver 119 transmits the response to one or more applications operating in the application software 123. The radio smart card reader driver 119 formats the response so that it appears to the application software 123 and/or the operating system 125 to be a response from a smart card reader and smart card.

In block 325, the operating system 125 or the application software 123 performs one or more actions based on the response received from the radio smart card reader driver 119. In an embodiment, the operating system 125 receives the response from the radio smart card reader driver 119, and, based on the response, authenticates the user, or does not authenticate the user. In an embodiment, an application executing in the application software 123 receives the response from the radio smart card reader driver 119, and executes one or more commands based on the response.

In block 327, the radio smart card reader driver 119 continues to monitor the application software 123 and the operating system 125 for requests for access to the smart card, and continues to monitor the smart card reader emulation device radio transceiver 121 for signals received from the portable wireless device 101. The method may return to block 313, and continue to monitor until a connection end event is received or another request is received from the application software 123 or the operating system 125.

Figure 4:
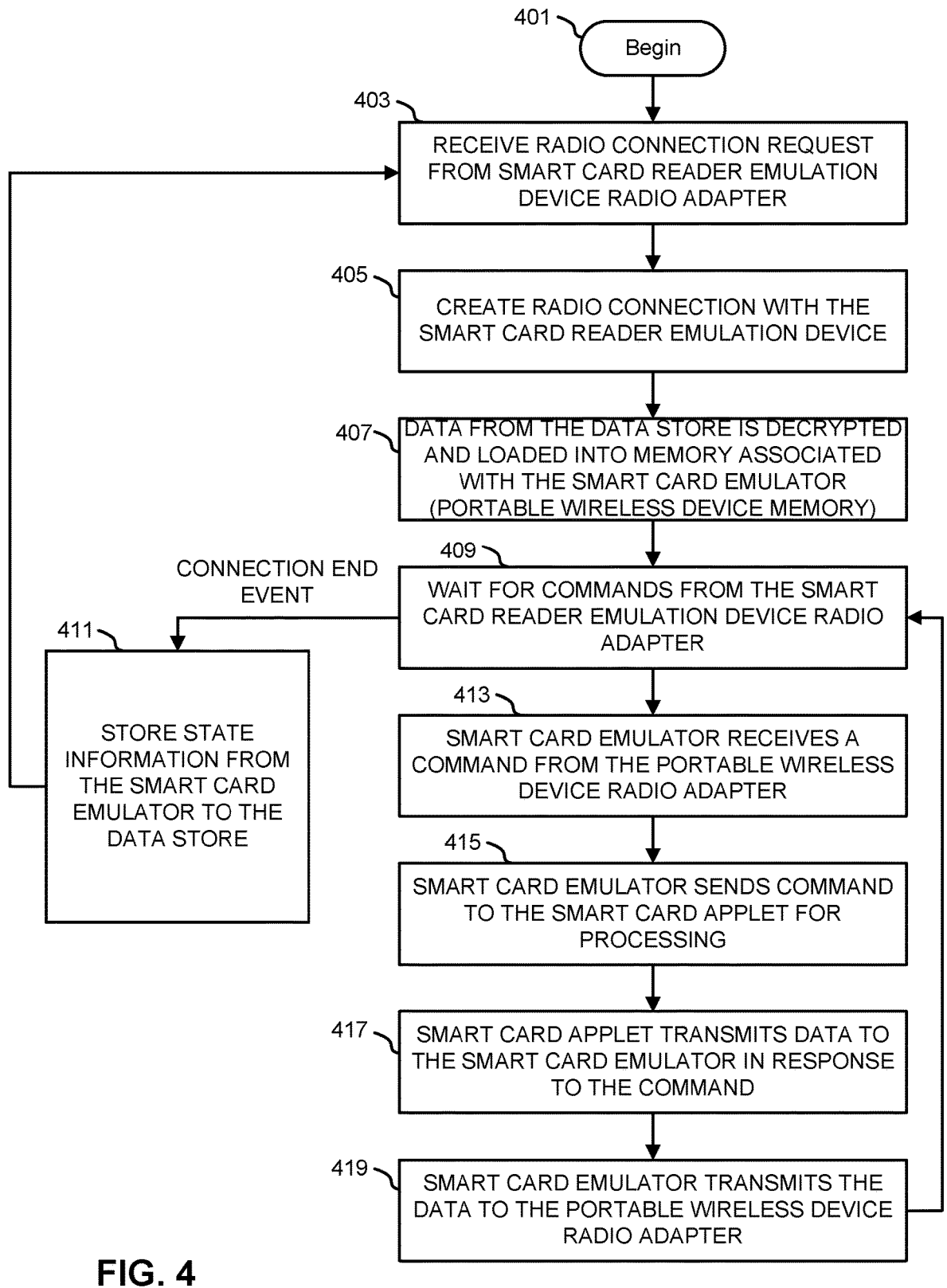
FIG. 4 is a flowchart illustrating remote authentication according to a smart phone according to an embodiment of the present disclosure.

FIG. 4 is a flowchart illustrating remote authentication according to a portable wireless device 101 according to an embodiment of the present disclosure. The method may begin at block 401. The method presumes that a portable wireless device 101 is operating, that the portable wireless device application 109 is operating on the portable wireless device 101, and that the portable wireless device radio transceiver 103 is operable.

In block 403, the portable wireless device radio transceiver 103 receives a radio connection request from the smart card reader emulation device radio transceiver 121. In an embodiment, the radio connection request includes a connection request identified by the Bluetooth protocol. The connection request may be encrypted, or may include additional information regarding the smart card reader emulation device radio transceiver 121, the smart card reader emulation device 117, and/or the radio smart card reader driver 119.

In block 405, if the portable wireless device 101 identifies the smart card reader emulation device radio transceiver 121, the smart card reader emulation device 117, and/or the radio smart card reader driver 119, the portable wireless device 101 may create a connection with the smart card reader emulation device 117. In an embodiment, the connection may be made via Bluetooth protocol. In an embodiment, other radio communication protocols may be used. In an embodiment, the radio communication protocols may require one or more codes or additional information to be input by the user via the portable wireless device 101, by the user and/or the operating system 125 on the smart card reader emulation device 117, or a combination of the two.

In block 407, data from the data store 115 associated with the portable wireless device application 109 is loaded into memory associated with the portable wireless device application 109. In an embodiment, the memory may be associated with the portable wireless device 101. In an embodiment, the memory may not be associated with a portable wireless device 101, but may be separate from the portable wireless device 101 memory. The data from the data store 115 may include, but is not limited to, one or more public and/or private keys that uniquely identify a user, one or more pieces of biometric data that uniquely identify a user, one or more certificates, or other data associated with the user, or that may be used to uniquely identify a user. In an embodiment, the data from the data store 115 may be encrypted in the data store 115, and may be decrypted prior to storage in the memory. In an embodiment, PINs, passwords, and/or lockout counters may also be stored in the data store 115.

In block 409, the portable wireless device application 109 waits for commands from the smart card reader emulation device radio transceiver 121. The commands may be, but are not limited to, authentication requests from the application software 123 and/or the operating system 125, that are intercepted by the radio smart card reader driver 119. While the portable wireless device applications 109 waits for commands from the smart card reader emulation device radio transceiver 121, the portable wireless device 101 may move out of range of the smart card reader emulation device radio transceiver 121. In the connection end event, shown in block 411, the radio transceiver from the portable wireless device 101 cannot communicate with the smart card reader emulation device radio transceiver 121, and the portable wireless device application 109 stores updated or new state information from the smart card application to the data store 115. The updated or new state information may include, but is not limited to, information modified since the connection was created in block 405, such as new or updated key pairs, PIN or password lockout counter updates, updated certificates, or other changed or new information that has been generated. The state information may be encrypted before storage in the data store 115. If a connection end event is indicated, the method may return to block 403, where the portable wireless device 101 may wait for radio connection requests from the smart card reader emulation device 117, or from another smart card reader emulation device 117.

In block 413, the portable wireless device application 109 receives one or more commands from the portable wireless device radio transceiver 103. The one or more commands may be, but are not limited to, authentication requests from the application software 123 and/or the operating system 125 via the radio smart card reader driver 119. The portable wireless device application 109 receives the command or commands via the portable wireless device radio transceiver 103. The portable wireless device application 109 receives the one or more commands, and transmits the one or more commands to the smart card applet 113.

In block 415, the smart card emulator 111 translates the commands received from the portable wireless device radio transceiver 103 into one or more commands that the smart card applet 113 may receive and process. The smart card emulator 111 transmits the one or more commands to the smart card applet 113.

In block 417, the smart card applet 113 receives the one or more commands from the smart card emulator 111, and accesses the data store 115 or other memory associated with the portable wireless device application 109, to retrieve information in order to formulate a response to the one or more commands. The smart card applet 113 may, for example, retrieve one or more certificates from the data store 115 and/or the memory associated with the portable wireless device 101 in response to the one or more commands. In an embodiment, the smart card applet 113 may retrieve biometric identification information from the data store 115 and/or the memory associated with the portable wireless device 101 in response to the one or more commands. In an embodiment, the smart card applet 113 may retrieve additional information from the data store 115 and/or the memory associated with the portable wireless device 101 in response to the one or more commands. In an embodiment, the smart card applet 113 may perform one or more transformations on the data received from the data store 115 and/or the memory associated with the portable wireless device 101. For example, and without limitation, the smart card applet 113 may retrieve a public key and/or a private key from the data store 115 and/or memory associated with the portable wireless device 101, and may apply the key to the one or more commands received from the smart card emulator 111. The smart card applet 113 transmits the information retrieved to the smart card emulator 111. In an embodiment, the smart card applet 113 may also compare a supplied PIN or password with the correct value, may compare the user's supplied fingerprint data with that stored, may store a supplied certificate or key for later use, or may generate a new key pair in accordance with the parameters supplied.

In block 419, the smart card emulator 111 transmits the response from the smart card applet 113 to the portable wireless device radio transceiver 103. The portable wireless device radio transceiver 103 may transmit the response to the smart card reader emulation device radio transceiver 121 via one or more radio communication protocols. In an embodiment, the response, or other information associated with the response, may be encrypted and or compressed before transmission to the smart card reader emulation device radio transceiver 121. After the smart card emulator 111 in the portable wireless device radio transceiver 103 has transmitted the response to the smart card reader emulation device radio transceiver 121, the method may return to block 409, where the portable wireless device 101 may wait for additional commands to be received from a requesting software via the smart card reader emulation device radio transceiver 121.

Figure 5:
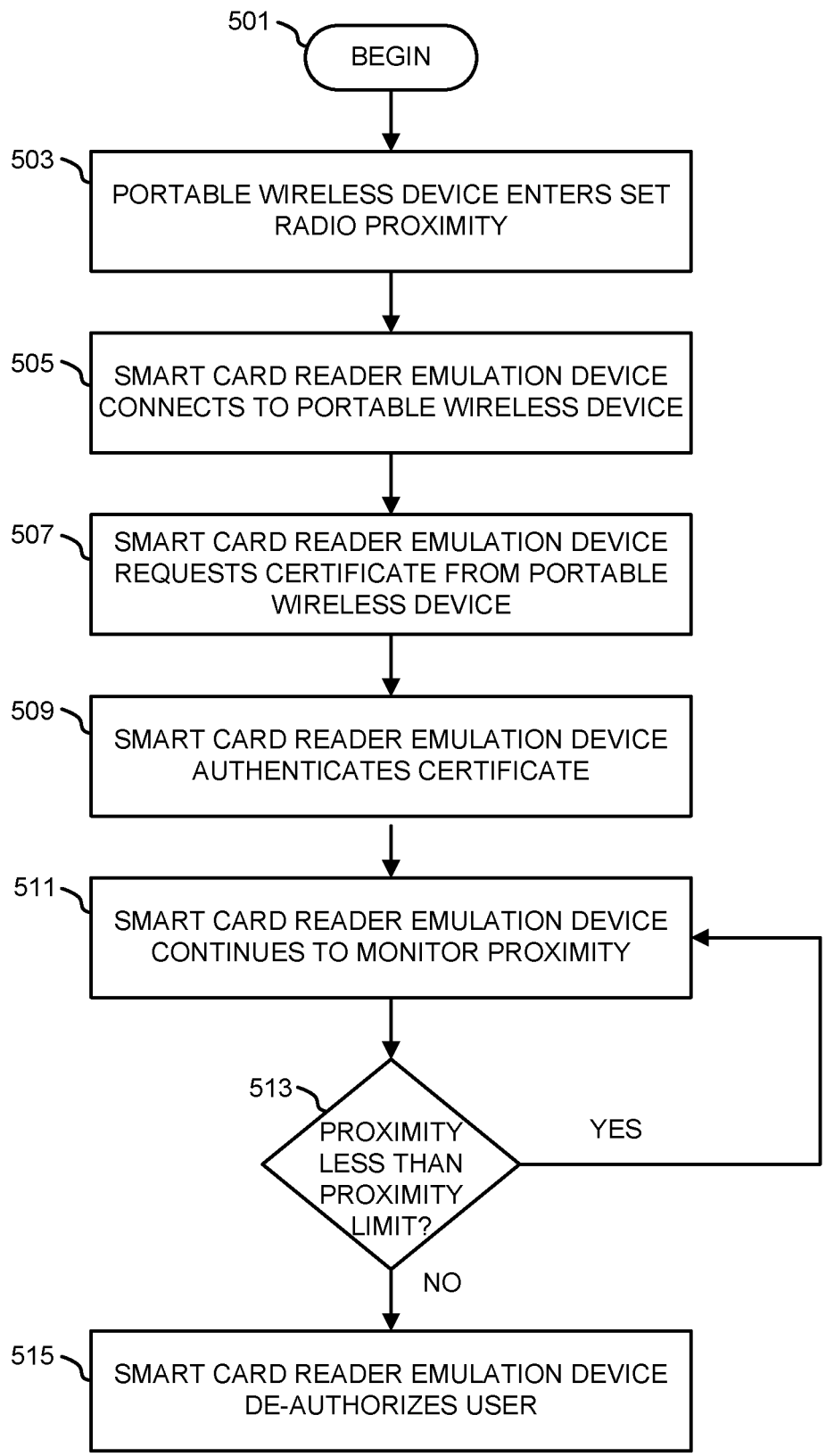
FIG. 5 is a flowchart illustrating a method of proximity authentication according to an embodiment of the present disclosure.

FIG. 5 is a flowchart illustrating a method of proximity authentication according to an embodiment of the present disclosure. The method may begin at block 501. The method presumes that the smart card reader emulation device radio transceiver 121 is active and is able to connect with the portable wireless device radio transceiver 103. The method also presumes that the portable wireless device radio transceiver 103 is active and able to pair with the smart card reader emulation device radio transceiver 121.

In block 503, the portable wireless device 101 enters a range of the smart card reader emulation device radio transceiver 121, so that the strength of the portable wireless device radio transceiver 103 is at or above a set level. The smart card reader emulation device radio transceiver 121 measures the signal strength from the portable wireless device 101. The level, in an embodiment, may be set by the user. In another embodiment, the level is set by the radio smart card reader driver 119 and/or the smart card reader emulation device radio transceiver 121. In an embodiment, the level may be set so that any contact which enables the smart card reader emulation device radio transceiver 121 to make and maintain a radio connection to the portable wireless device radio transceiver 103 may be sufficient. In another embodiment, the level may be set so that more substantial signal strength is required to enable a connection, and so a connection may be refused by the smart card reader emulation device radio transceiver 121 even though a sufficient radio connection may be made. For example, and without limitation, if the level is set so that the smart card reader emulation device radio transceiver 121 refuses connections unless the signal strength indicates the portable wireless device radio transceiver 103 is no more than 5 feet away, a radio connection may be refused if the signal strength indicates that the portable wireless device radio transceiver 103 is 10 feet away from the smart card reader emulation device radio transceiver 121. The connection may be refused even if the smart card reader emulation device radio transceiver 121 and the portable wireless device radio transceiver 103 can make a connection at 10 feet or more. The level may be set by a user, or may be set according to a security policy and/or other commands from a policy server or other system.

In an embodiment, instead of the signal strength being selected and used to set a level, the transmit power of the radio transceiver 121 or the radio transceiver 103 is changed, so that the level indicates the range at which a connection may be made. For example, the smart card reader emulation device 117 may transmit commands to the remote wireless device 101 for the remote wireless device 101 to set its radio transceiver 103 at a certain level, according to the user's request or one or more security policies. The remote wireless device 101 may set the transmit power of the radio transceiver 103 to the level specified by the smart card reader emulation device 117, so that when the radio transceiver 103 and the radio transceiver 121 are in range to create a connection, the transceivers are also within range of the level set by the user or the one or more security policies.

In block 505, if the portable wireless device 101 is within range of the smart card reader emulation device radio transceiver 121, and is also within the limit, the smart card reader emulation device radio transceiver 121 will form a radio connection with the radio transceiver 103 associated with the portable wireless device 101.

In block 507 the operating system 125, the application software 123, and/or the radio smart card reader driver 119 may request an authentication from the portable wireless device application 109. In an embodiment, the operating system 125, the application software 123, and/or the radio smart card reader driver 119 may request one or more certificates from the portable wireless device application 109. In an embodiment, the smart card reader emulation device 117 may send one or more challenge requests to the portable wireless device 101. The challenge requests may include, for example, data to encrypt with one or more keys, for example by an asymmetric key pair, where one of the keys is resident on the smart card reader emulation device 117, and the other complimentary key is resident on the portable wireless device 101. In an embodiment, a username and/or password may be requested from the portable wireless device 101. In an embodiment, the portable wireless device 101 may be challenged to sign a random value using one or more keys available to the portable wireless device application 109.

In block 509, the portable wireless device radio transceiver 103 receives the authentication request, and transmits the authentication request to the portable wireless device application 109. The portable wireless device application 109 receives the authentication request, and transmits the authentication request to the smart card emulator 111. The smart card emulator 111 receives the authentication request, and transmits the authentication request to the smart card applet 113. The smart card emulator 111 may translate the authentication request so that it is readable by the smart card applet 113. The smart card applet 113 receives the authentication request from the smart card emulator 111, and accesses the data store 115 and/or the memory associated with the portable wireless device 101 to create a response to the authentication request. The response may include, but is not limited to, public and/or private keys, certificates, or unique biometric information associated with the user. The smart card applet 113 transmits the response to the smart card emulator 111. The smart card emulator 111 receives the response from the smart card applet 113, and transmits the response via the portable wireless device radio transceiver 103 to the smart card reader emulation device radio transceiver 121. The smart card reader emulation device radio transceiver 121 receives the response, and transmits the response to the radio smart card reader driver 119. The radio smart card reader driver 119 receives the response, and transmits the response to the application software 123 and/or the operating system 125. The application software 123 and/or the operating system 125 receives the response, and performs one or more actions based on the response. The actions may include, but are not limited to, authorizing a user to operate the smart card reader emulation device 117, or perform one or more tasks with the authority of the user.

In block 511, the smart card reader emulation device radio transceiver 121 continues to monitor the signal strength of the portable wireless device radio transceiver 103. In block 513, if the signal strength from the portable wireless device radio transceiver 103 is at or above the limit specified, the method returns to block 511 to continue to monitor the signal strength. If the signal strength from the portable wireless device radio transceiver 103 is below the limit specified, the method proceeds to block 515, and the smart card reader emulation device 117 de-authorizes the user from using the smart card reader emulation device 117. The de-authorization may include, but is not limited to, logging the user off of the smart card reader emulation device 117, locking the smart card reader emulation device 117 to prevent access, or other actions by the operating system 125 and/or the application software 123 to prevent the user from unauthorized access to the smart card reader emulation device 117. The user may also be deauthorized if cached PIN and/or password values are erased from the portable wireless device 101 and/or the smart card reader emulation device 117, so that they must be re-entered the next time an authentication request is received. If the portable wireless device 101, and the portable wireless device radio transceiver 103, moved again to within the proximity limit, the method may begin again at block 505. In an embodiment, the smart card reader emulation device 117 does not de-authorize the user and/or remove the certificate, so if the portable wireless device radio transceiver 103 moves again to within the proximity limit, the smart card reader emulation device 117 may reauthorize the user to access the smart card reader emulation device 117, and may continue at block 511.

Among other advantages, the present disclosure may allow the use of portable wireless devices or other devices a user carries with one or more processors and memory in place of one or more smart cards. Accordingly, the proposed techniques can improve user control of devices by providing a more intuitive and user-friendly way to use a smart card infrastructure and/or other multi-factor authentication effectively. Additionally, the smart phone's keyboard, touch screen, and other sensors can be used as inputs to the smart card applet. Information about which resources are being authenticated to can be presented to the user on the smart phone's screen, so that the user is aware of what resources are being accessed while the smart phone is connected to the computer. The user could also be given a choice about whether or not to accept such accesses. Also, information stored in the smart card applet can be displayed to the user on the smart phone's screen. Other advantages will be recognized by those of ordinary skill in the art.

In another embodiment, a method of user authentication employing a very short range wireless communication link such as a near field communication link and a short range wireless communication link such as a Bluetooth type link or other suitable link is employed. Is this embodiment, a portable wireless device 101 (see FIG. 2) and another device such as a desktop, laptop computer, or smart card reader emulation device 117 may be employed. In this embodiment, the first radio transceiver 207 may be a very short range wireless transceiver and the first radio transceiver 203 may also be a very short range wireless transceiver. The two transceivers perform a near field communication link operation as known in the art when, for example, the portable wireless device 101 is touched distance to the first radio transceiver 203. The second radio transceiver 209 may be a short range wireless transceiver that may have a wireless range of 30 meters or less. Similarly, second radio transceiver 205 may also be a short range wireless transceiver of the same type as second radio transceiver 209. As such, both devices each have a very short range wireless transceiver and a short range wireless transceiver. As previously described, each of the devices also includes logic such as discrete logic, suitably programmed processors, state machines, or any other suitable logic to carry out the operations described herein. In this example, a near field communication tap is used to automatically initiate user authentication. In this example, user logon authentication will be described. Also in this example, mutual authentication based user authentication will be employed meaning that at least two credentials are required to provide user logon to the device 117 including, for example, a logon to a particular executing application, function, subsystem or any other resource. This may include access to websites or any other suitable operation requiring a user authentication. In this example, both a device level authentication occurs as well as a user ID identification such as the use of a personal identification number or any other suitable information.

Figure 7:
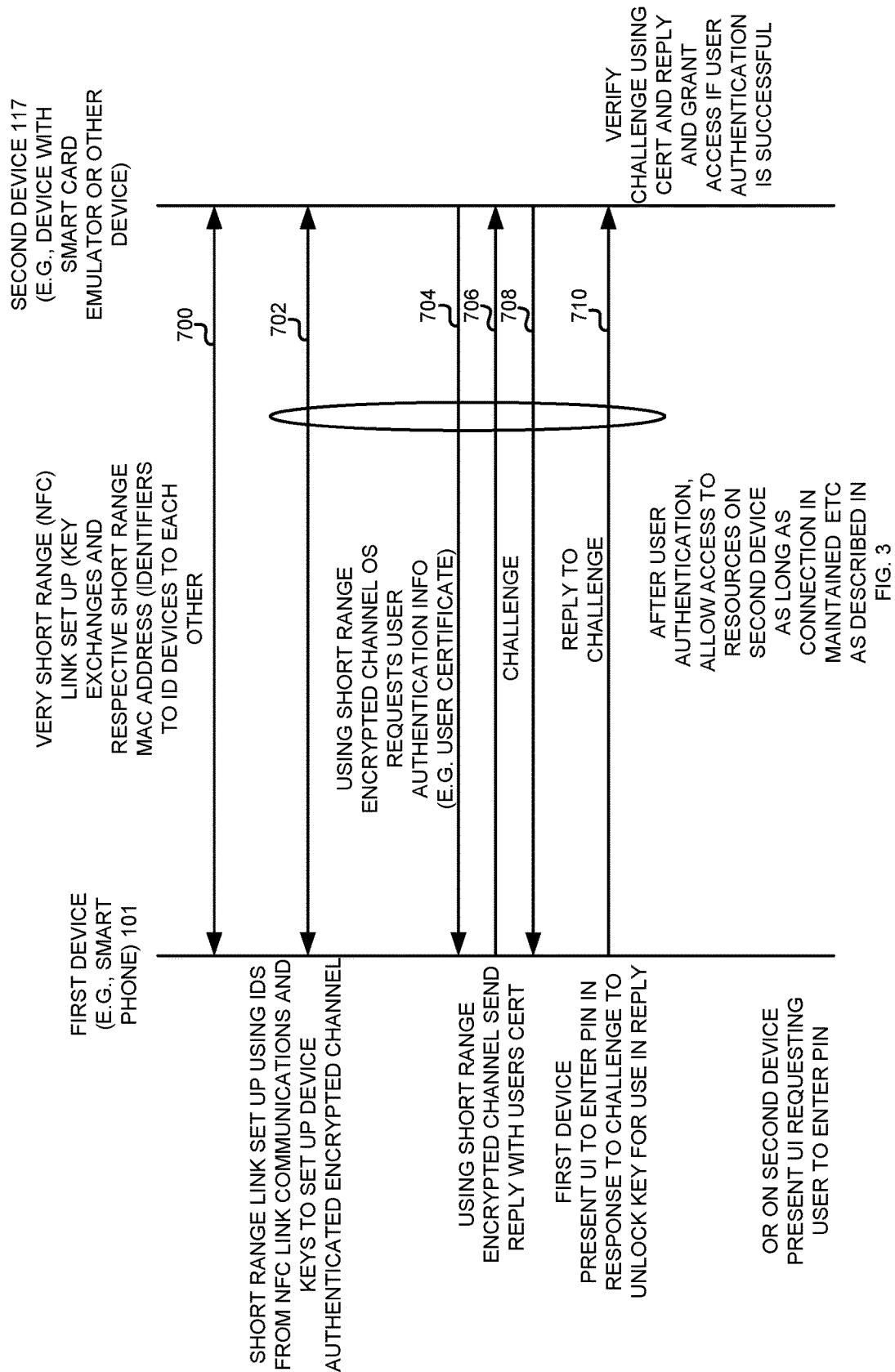
FIG. 7 is a diagram graphically illustrating communications between a first device and a second device in accordance with one example set forth in the disclosure.
Figure 8:
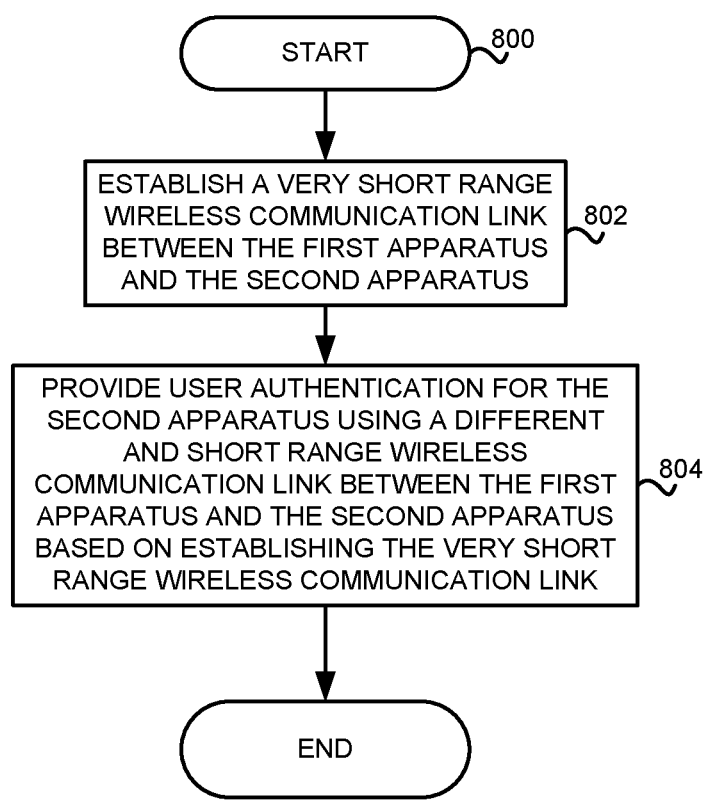
FIG. 8 is a flowchart illustrating one method for providing user authentication in accordance with one example set forth in the disclosure.

Referring also to FIGS. 7 and 8, a method for user authentication will be described using the system of FIG. 2 for example. As shown in FIG. 8, the method may begin as shown in block 800. The method may replace blocks 303, 305, 307 and 309 of FIG. 3. As shown in block 802, the method includes establishing a very short range wireless communication link between the two devices 101 and 117. This is also shown by communication 700 (FIG. 7) between the first and second device wherein, for example, a near field communication link is setup, as known in the art that employs cryptographic key exchanges and respective short range MAC addresses to provide identifiers to identify the devices 101 and 117 to each other. As shown by communication 702, the logic in the two devices use the very short range link to exchange link setup information for a short range wireless link that will be setup using the short range wireless transceivers 209 and 205. As such, the very short range wireless link is used to exchange link setup information for the short range wireless link. The logic in the devices establishes a short range wireless link using the short range wireless transceivers 205 and 209 to provide an encrypted channel based on the exchanged link setup information that was communicated using the very short range wireless link (shown as 702).

As shown in block 804, the method includes providing user authentication for the device 117 using the short range wireless communication link between the two devices based on establishing the very short range wireless communication link. This may be accomplished, for example, by using the short range encrypted channel so that, for example, an operating system or other operation executing on the logic requests user authentication information such as a user certificate from the portable wireless device 101. This is shown as communication 704. In response, the short range encrypted channel is used to send a reply with the user certificate as shown in communication 706. The device 117 sends a challenge to the device 101 which, for example, presents a user interface to enter a personal identification number (PIN) in response to the challenge to unlock a cryptographic key for use in the reply to the challenge. This is shown in communication 708. As shown in communication 710, if the PIN entry is successful on the portable wireless device, for example, a reply to the challenge is then sent to the device 117. The device 117 then verifies the challenge using the certificate that was sent in the reply and grants access of user authentication is successful. As such, the device 117 authenticates the user based on communicated user authentication information (in this example, a certificate and a PIN) that was sent using the short range wireless link in response to using the very short range wireless link.

In other words, an NFC tap initiates the process to setup another and different link (the short range link) through which user authentication information is sent to the other device so that the other device can authenticate the user. In this example, a user logon challenge was sent to the first device, namely a smart phone, and the second device received a user logon reply from the first device based on the user logon challenge using the short range wireless link. This occurred after the very short range link was setup and used to exchange link configuration information to setup the secondary or short range wireless link. As such, after a Bluetooth encrypted channel has been setup, the user authentication is performed based on user credentials. There is no need for users to attempt to select which device to use in a room of multiple devices to which to authenticate, since a very short range communication link is setup through physical proximity of the very short range link. Each time the devices are tapped to each other, another authentication can occur. The encrypted Bluetooth channel is used to communicate the user authentication information.

Figure 9:
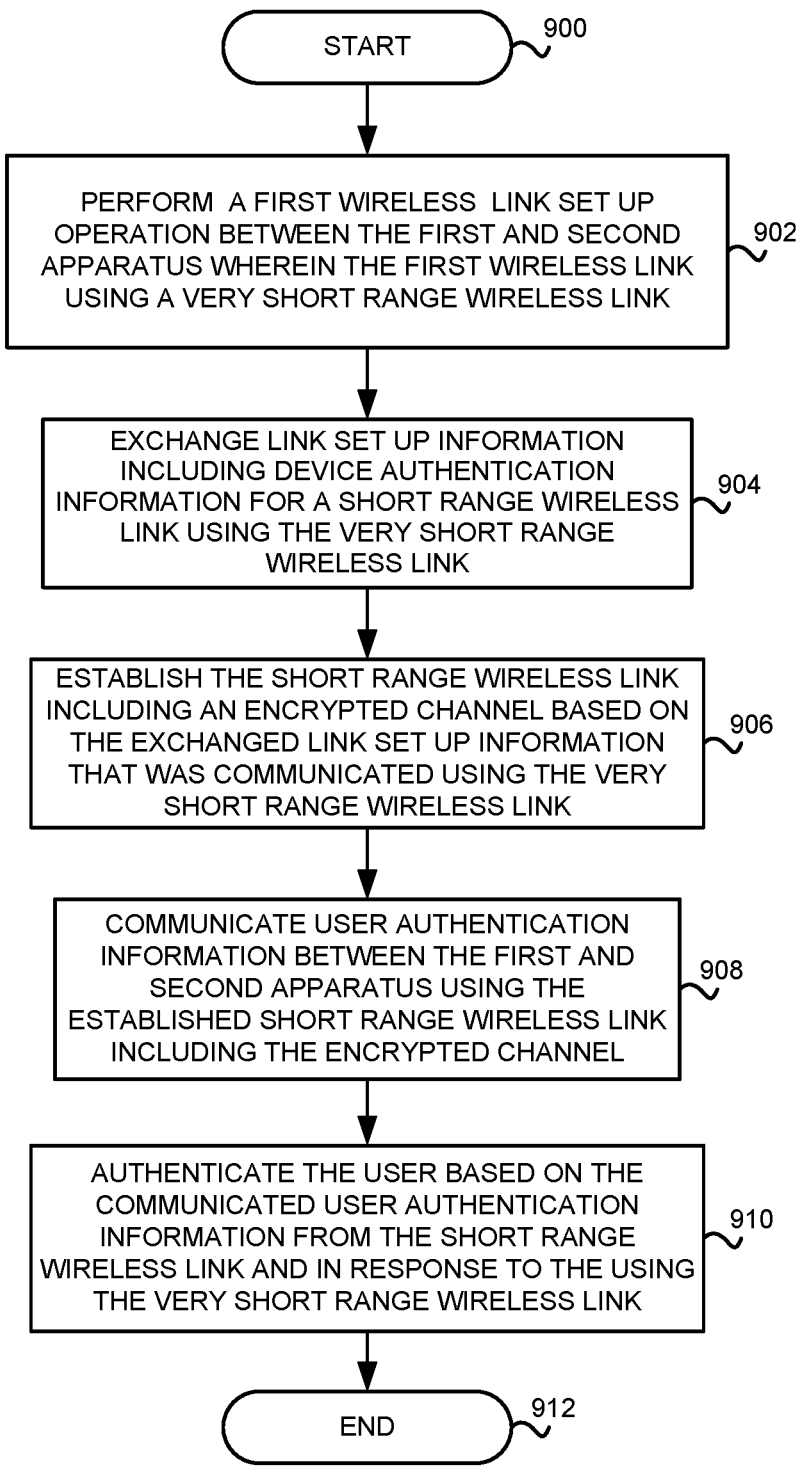
FIG. 9 is a flowchart illustrating one method for providing user authentication in accordance with one example set forth in the disclosure.

Referring to FIG. 9, a method for providing user authentication is shown. As shown in block 900, the method begins and as shown in block 902, the method includes performing a wireless link setup operation between a first device and a second device wherein the first wireless link uses a very short range wireless link such as a near field communication link between the first and second apparatus. As shown in block 904, the method includes exchanging link setup information such as device authentication information which may be cryptographic keys and device IDs using the very short range wireless link that is used to setup the short range wireless communication link and operation. As shown in block 906, the method includes establishing the short range wireless link which is setup as an encrypted channel based on the exchanged link setup information that was communicated using the very short range wireless link. As shown in block 908, the method includes communicating user authentication information between the first and second apparatus using the established short range wireless link that is operating as an encrypted channel. As shown in block 910, the method includes authenticating the user based on the communicated user authentication information communicated over the short range wireless link and in response to using the very short range wireless link. In other words, the short range link is not setup unless the very short range wireless link is established and used to communicate link setup information for the short range wireless link. The method may then continue as shown in block 912 for another user tap and authenticate operation if desired.

As also shown in FIG. 3, the operation of FIG. 8 may be carried out, for example, prior to block 317. However, it will be recognized that the process may be carried out at any suitable point and need not be carried out in connection with the operation of FIG. 3 if desired.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method, carried out by a first apparatus and a second apparatus, for user authentication comprising:
   establishing a very short range wireless communication link between the first apparatus and the second apparatus; and
   authenticating a user of the first apparatus by the second apparatus directly using a different and short range peer to peer wireless communication link between the first apparatus and the second apparatus in response to establishing the very short range wireless communication link.

2. The method of claim 1 wherein authenticating a user of the first apparatus by the second apparatus using a different and short range peer to peer wireless communication link comprises communicating user logon authentication information between the first and second apparatus using the established short range peer to peer wireless link and wherein link keys are exchanged over the very short range peer to peer wireless communication link for use with the short range wireless link.

3. The method of claim 1 wherein the very short range wireless communication link is a near field communication link and wherein the short range communication link has less than a 30 meter range and wherein the method comprises passing user authentication credentials from the first apparatus to the second apparatus.

4. The method of claim 1 wherein authenticating the user of the first apparatus by the second apparatus using a different and short range peer to peer wireless communication link comprises sending, without user intervention, by the second device a request to the first device for user authentication information and sending by the first device, a reply without user intervention, that includes a user certificate.

5. The method of claim 4 wherein establishing the very short range wireless communication link between the first apparatus and the second apparatus comprises a near field communication tap operation to initiate setup of the different and short range peer to peer wireless communication link.

6. The method of claim 1 comprising wherein authenticating the user of the first apparatus by the second apparatus using a different and short range peer to peer wireless communication link comprises sending, by the second apparatus, a user logon challenge to the first apparatus in direct response to the very short range wireless link being established and receiving a user logon reply from the first apparatus based on the user logon challenge using the short range peer to peer wireless link.

7. A system for providing user authentication comprising:
   a first apparatus comprising:
      a first very short range wireless transceiver;
      a first short range peer to peer wireless transceiver; and
      first logic operatively coupled to both the first very short range transceiver and the first short range peer to peer wireless transceiver;
   a second apparatus comprising:
      a second very short range wireless transceiver;
      a second short range peer to peer wireless transceiver; and
      second logic operatively coupled to both the second very short range transceiver and the second short range peer to peer wireless transceiver;
   wherein the first and second logic are operative to:
   establish a very short range wireless communication link between the first apparatus and the second apparatus; and
   authenticate a user of the first apparatus by the second apparatus directly using a different and short range peer to peer wireless communication link between the first apparatus and the second apparatus in response to establishing the very short range wireless communication link.

8. The system of claim 7 wherein authenticating a user of the first apparatus by the second apparatus using a different and short range peer to peer wireless communication link comprises communicating user logon authentication information between the first and second apparatus using the established short range peer to peer wireless link and wherein link keys are exchanged over the very short range peer to peer wireless communication link for use with the short range wireless link.

9. The system of claim 7 wherein the very short range wireless communication link is a near field communication link and wherein the short range communication link has less than a 30 meter range and wherein the method comprises passing user authentication credentials from the first apparatus to the second apparatus.

10. The system of claim 7 wherein authenticating the user of the first apparatus by the second apparatus using a different and short range peer to peer wireless communication link comprises sending, without user intervention, by the second device a request to the first device for user authentication information and sending by the first device, a reply without user intervention, that includes a user certificate.

11. The system of claim 10 wherein establishing the very short range wireless communication link between the first apparatus and the second apparatus comprises a near field communication tap operation to initiate setup of the different and short range peer to peer wireless communication link.

12. The system of claim 7 comprising wherein authenticating the user of the first apparatus by the second apparatus using a different and short range peer to peer wireless communication link comprises sending, by the second apparatus, a user logon challenge to the first apparatus in direct response to the very short range wireless link being established and receiving a user logon reply from the first apparatus based on the user logon challenge using the short range peer to peer wireless link.

\* \* \* \* \*